(12) United States Patent
Jatkar

(10) Patent No.: US 11,300,022 B2
(45) Date of Patent: Apr. 12, 2022

(54) METHOD AND SYSTEM FOR PROCESSING EXHAUST GAS

(71) Applicant: Jayant Jatkar, Naperville, IL (US)

(72) Inventor: Jayant Jatkar, Naperville, IL (US)

( * ) Notice: Subject to any disclaimer, the term of this patent is extended or adjusted under 35 U.S.C. 154(b) by 0 days.

(21) Appl. No.: 14/826,529

(22) Filed: Aug. 14, 2015

(65) Prior Publication Data
US 2017/0044944 A1 Feb. 16, 2017

(51) Int. Cl.
| F25J 3/02 | (2006.01) |
| F01N 3/02 | (2006.01) |
| F01N 3/021 | (2006.01) |
| F25J 3/06 | (2006.01) |

(52) U.S. Cl.
CPC ........... *F01N 3/0205* (2013.01); *F01N 3/021* (2013.01); *F25J 3/067* (2013.01); *F01N 2240/02* (2013.01); *F01N 2240/22* (2013.01); *F01N 2240/26* (2013.01); *F01N 2570/10* (2013.01); *Y02T 10/12* (2013.01)

(58) Field of Classification Search
CPC ........ F25J 3/0266; F25J 3/067; B01D 53/526
See application file for complete search history.

(56) References Cited

U.S. PATENT DOCUMENTS

| 3,677,019 A | 7/1972 | Olszewski |
| 4,566,278 A | 1/1986 | Force |
| 4,681,612 A * | 7/1987 | O'Brien .................. B01D 53/22 62/624 |
| 4,770,676 A | 9/1988 | Sircar et al. |
| 5,233,837 A * | 8/1993 | Callahan .............. B01D 53/229 60/648 |
| 5,385,023 A * | 1/1995 | Montemayor .......... C01B 32/55 62/605 |
| 5,642,630 A * | 7/1997 | Abdelmalek ...... B01D 53/1431 62/632 |
| 5,681,360 A * | 10/1997 | Siwajek ............ B01D 53/1418 48/127.3 |
| 5,845,516 A | 12/1998 | Allen, Jr. |
| 6,301,927 B1 * | 10/2001 | Reddy .................... F25J 3/0655 62/619 |
| 6,349,565 B1 | 2/2002 | Greer |
| 7,332,146 B1 | 2/2008 | Huang et al. |
| 7,582,140 B2 | 9/2009 | Silva et al. |
| 8,460,434 B2 | 6/2013 | Turner et al. |
| 8,480,789 B2 | 7/2013 | Sorensen et al. |
| 8,887,510 B2 | 11/2014 | Christensen et al. |

(Continued)

OTHER PUBLICATIONS

International Search Report and Written Opinion for PCT/US2016/046325 dated Oct. 21, 2016.

(Continued)

*Primary Examiner* — Brian M King
(74) *Attorney, Agent, or Firm* — Erickson Law Group, PC

(57) ABSTRACT

A method of processing exhaust gas includes receiving incoming exhaust gas and cooling it in at least one heat exchanger to create cooled exhaust gas. The cooled exhaust gas is compressed in a compressor to liquefy $CO_2$ leaving a remaining exhaust gas. The remaining exhaust gas is circulated through the heat exchanger to cool subsequent incoming exhaust gas and warm the remaining exhaust gas. At least a portion of the liquid $CO_2$ may be pelletized in a pelletizer.

14 Claims, 6 Drawing Sheets

(56) References Cited

U.S. PATENT DOCUMENTS

| | | |
|---|---|---|
| 2002/0117391 A1* | 8/2002 | Beam .................... F25J 3/0266 |
| | | 203/81 |
| 2004/0093895 A1* | 5/2004 | Schreiber .............. A23L 3/3445 |
| | | 62/602 |
| 2004/0200393 A1 | 10/2004 | Zauderer |
| 2005/0066815 A1 | 3/2005 | Krushnevych et al. |
| 2008/0156035 A1 | 7/2008 | Aspelund et al. |
| 2010/0024472 A1 | 2/2010 | Amin et al. |
| 2010/0292524 A1 | 11/2010 | Turner et al. |
| 2011/0226010 A1* | 9/2011 | Baxter .................. B01D 53/002 |
| | | 62/619 |
| 2012/0023892 A1 | 2/2012 | Kulkarni et al. |
| 2012/0058042 A1 | 3/2012 | Zauderer |
| 2012/0111051 A1* | 5/2012 | Kulkarni .............. B01D 53/226 |
| | | 62/619 |
| 2012/0279227 A1 | 11/2012 | Timmins |
| 2013/0319040 A1* | 12/2013 | Naito .................... B01D 53/002 |
| | | 62/606 |
| 2013/0333391 A1 | 12/2013 | Sundaram et al. |
| 2017/0363351 A1* | 12/2017 | Caillat .................... F25J 3/061 |

OTHER PUBLICATIONS

Elton Quinn & Charles Jones, Carbon Dioxide, 1936, Reinhold Publishing Corporation, New York, pp. 7, 11, 58, and 63.

* cited by examiner

METHOD AND SYSTEM FOR PROCESSING EXHAUST GAS

FIELD

This disclosure relates to processing and separating exhaust gases. More specifically, this disclosure relates to a method and system for efficiently separating exhaust gases, such as exhaust from landfills and/or engines, into reusable component parts, including carbon dioxide and other purified gasses.

BACKGROUND

As wastes decompose in landfills, gases are generated as byproducts. These gases include carbon dioxide ($CO_2$), nitrogen ($N_2$), water vapor ($H_2O$), and other gases, as Welt as hydrocarbons, particularly methane ($CH_4$). Likewise, such exhaust gases containing methane may be produced by certain digesters, such as from the decomposition of grass, and from animal waste, such as Cow Dung. Similarly, engines that burn hydrocarbons, including gas turbines, produce exhaust that includes carbon dioxide, nitrogen, water vapor, and other gases. These gases in their combined form are generally emitted into the atmosphere creating pollution. However, the exhaust gases may be broken into component parts which may be useful in various industrial applications.

SUMMARY

In one embodiment, a method of processing exhaust gas includes receiving incoming exhaust gas and cooling it in at least one heat exchanger to create cooled exhaust gas. The cooled exhaust gas is compressed in a compressor to liquefy carbon dioxide ($CO_2$), leaving a remaining exhaust gas. The remaining exhaust gas is circulated through the heat exchanger to cool subsequent incoming exhaust gas and warm the remaining exhaust gas. At least a portion of the liquid $CO_2$ may be pelletized in a pelletizer.

A system for processing exhaust gas includes at least one heat exchanger that cools incoming exhaust gas and a compressor that compresses the cooled exhaust gas to liquefy $CO_2$ therein. The system further includes a tank that captures the liquid $CO_2$ and allows removal of a remaining exhaust gas. A circulation track passes the remaining exhaust gas through the heat exchanger to cool subsequent incoming exhaust gas and warm the remaining exhaust gas.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION OF THE DRAWINGS

Figure 1:
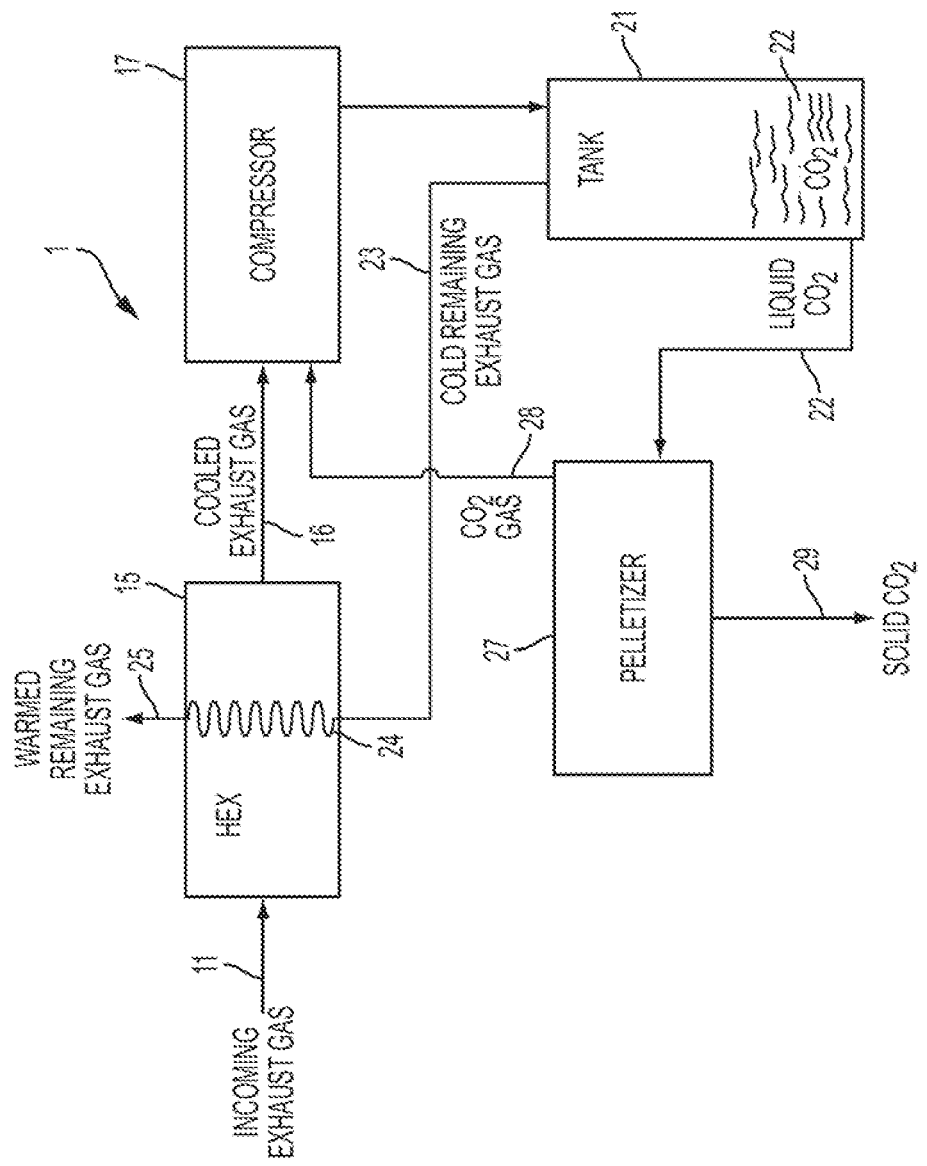
FIG. 1 provides a system diagram of one embodiment of a system and method for processing exhaust gas.

FIG. 1 provides one embodiment of a system 1 and method for processing exhaust gases that include carbon dioxide ($CO_2$). Incoming exhaust gas 11 is passed through a heat exchanger 15 where it is cooled. The cooled exhaust gas 16 is passed from the heat exchanger 15 into a compressor 17. In one embodiment, the cooled exhaust gas 16 is −20° F. The incoming exhaust gas 11 may be at various temperatures depending on the source of the exhaust gas and how the exhaust gas is transferred into the system 1. The compressor 17 compresses the cooled exhaust gas 16 sufficiently to liquefy the $CO_2$ therein, thus separating the cooled exhaust gas 16 into liquid $CO_2$ 22 and remaining exhaust gas 23. The compressed mixture of liquid $CO_2$ 22 and remaining exhaust gas 23 collects in tank 21, where the liquid $CO_2$ 22 sinks to the bottom of the tank. The remaining exhaust gas 23, which remains at a cold temperature, is removed from the tank 21 and circulated in circulation track 24. Circulation track 24 passes the remaining exhaust gas 23 through the heat exchanger 15 in order to cool subsequent incoming exhaust gas and warm the remaining exhaust gas 23. Thereby, the amount of energy needed to cool the subsequent incoming exhaust gas is reduced by utilizing the cold remaining exhaust gas 23 to absorb the heat from the incoming gas. The resulting warmed remaining exhaust gas 25 may then be utilized in certain applications, examples of which are described herein, or may be further processed to prepare them for use in a particular industrial application.

The liquid $CO_2$ 22 from the tank 21 is sent to pelletizer 27. The pelletizer 27 pelletizes at least a portion of the liquid $CO_2$ 22 into solid $CO_2$ 29. As will be understood by a person of ordinary skill in the art in light of this disclosure, the solid $CO_2$ 29, or dry ice, may be in any number of shapes or sizes, such as dry ice blocks, cylindrical dry ice pellets of any size, shaved dry ice, or the like. Any remaining $CO_2$ not pelletized becomes $CO_2$ gas 28. The $CO_2$ gas 28 is recirculated to the compressor 17, where it joins the cooled incoming exhaust gas 16 in being compressed and transferred to the tank 21. Accordingly, all of the $CO_2$ from the incoming exhaust gas 11 is maintained in the system 1 or outputted as solid $CO_2$ 29.

Accordingly, the present inventor has recognized that certain exhaust gasses may be distilled into component parts that can be utilized in various industrial applications, with little waste or creation of polluting matter. Furthermore, the amount of energy consumed by the system 1 is minimized by recapturing the cold from the processed remaining gases before they are outputted from the system 1.

Figure 2:
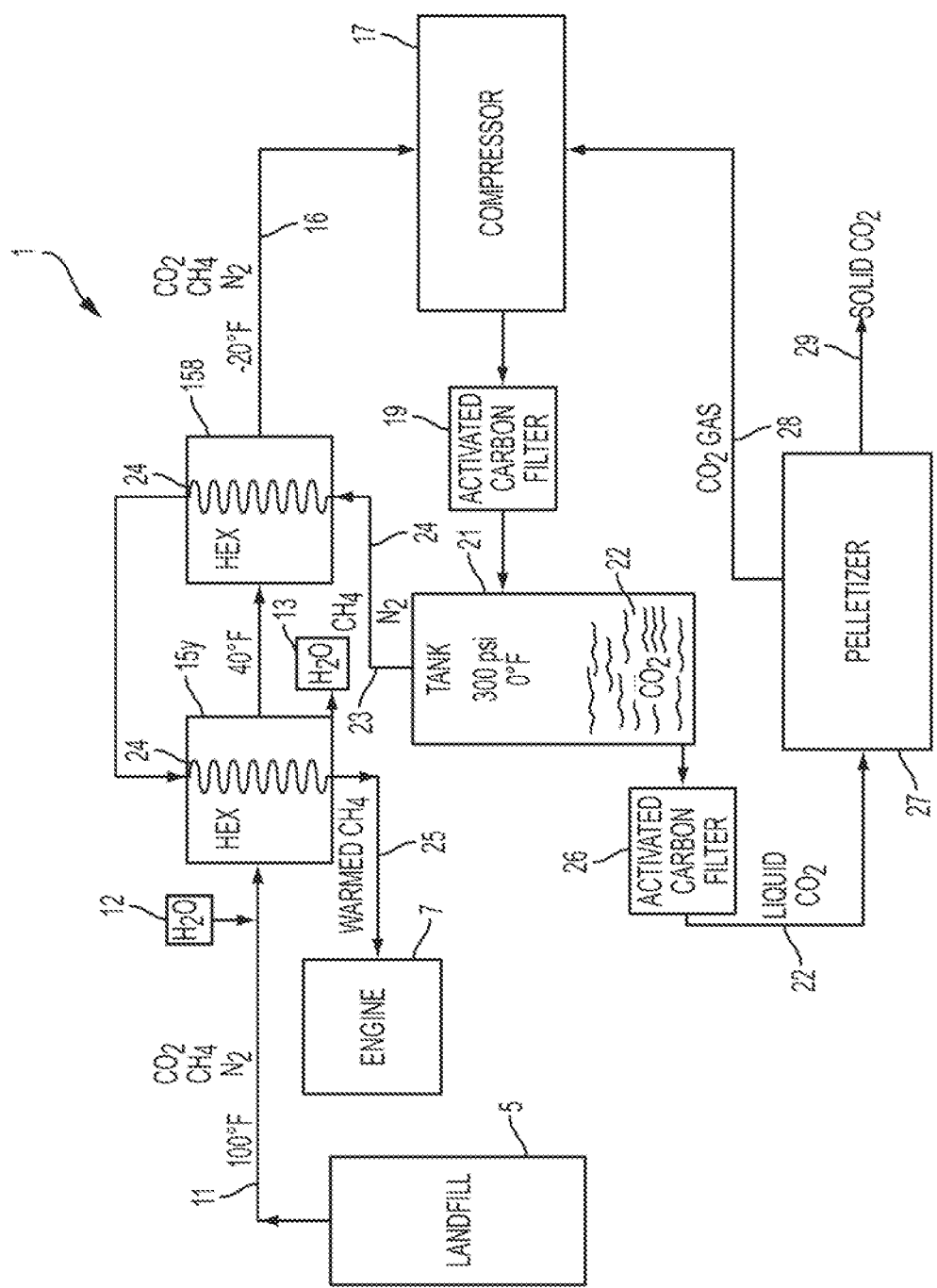
FIG. 2 provides a system diagram of another embodiment of a system and method for processing exhaust gas.

FIG. 2 depicts one embodiment of the system 1 wherein the incoming exhaust gas 11 is from a landfill 5. As an example, the incoming exhaust gas 11 may be at approximately 100° F. and the incoming exhaust gas 11 from the landfill may be primarily comprised of $CO_2$, methane ($CH_4$), and nitrogen ($N_2$). A small amount of contaminants may also be present in the incoming landfill gas 11. In an exemplary embodiment, the incoming landfill gas is comprised of approximately 50% $CH_4$, 45% $CO_2$, and 5% $N_2$, not accounting for any contaminants which may comprise a very small percentage of the incoming landfill gas 11. For example, contaminants may include mercury, formaldehyde, PCBs, or other inorganic materials, and/or unwanted gas combinations formed during cooling, such as nitrogen dioxide ($NO_2$) or sulfur dioxide ($SO_2$).

Figure 3:
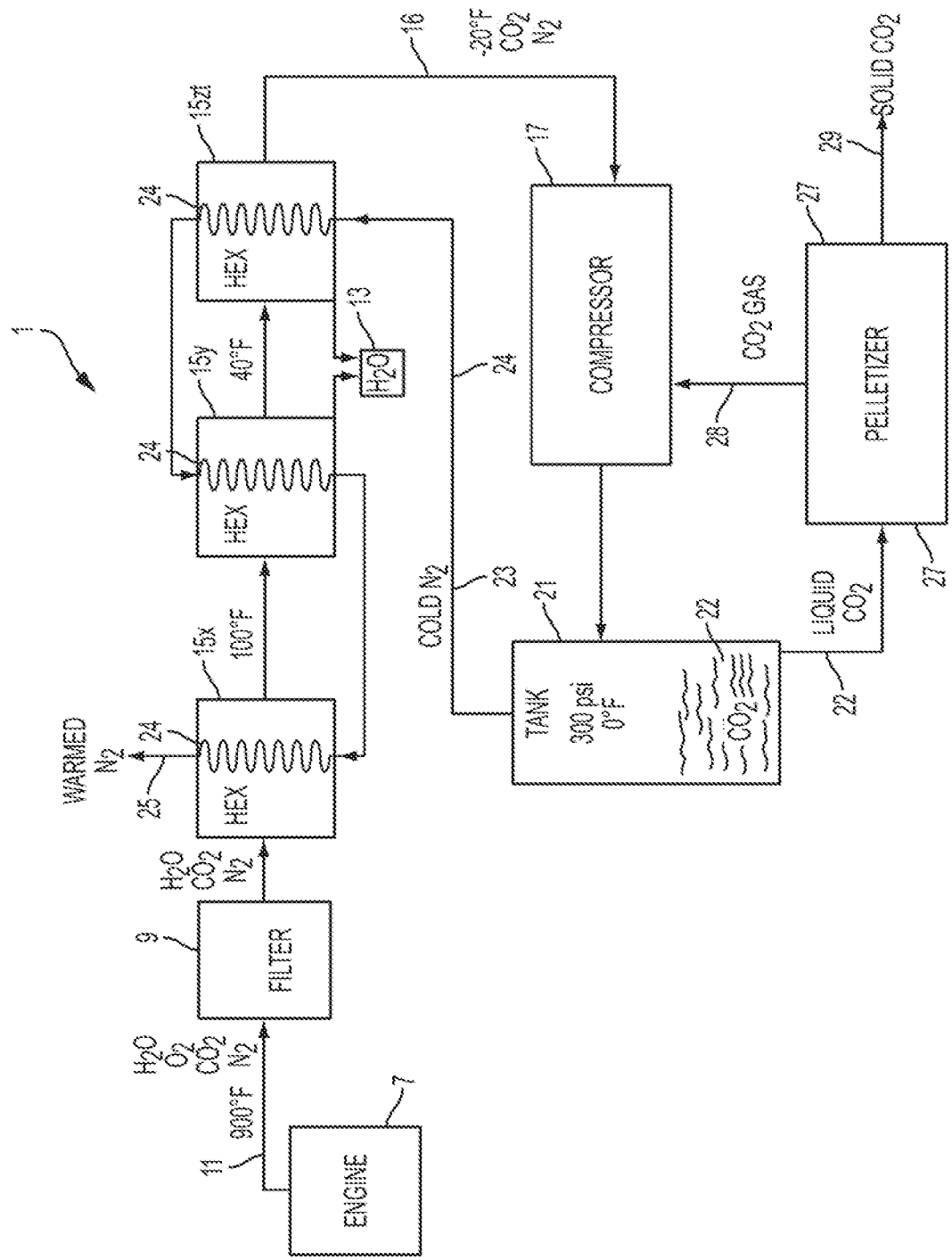
FIG. 3 provides a system diagram of another embodiment of a system and method for processing exhaust gas.

In the embodiments depicted in FIGS. 2 and 3, some or all of the contaminants may be removed from the incoming landfill gas during the cooling process by way of being trapped in condensation of any water vapor in the incoming landfill gas 11. Additionally, water may be sprayed into the incoming exhaust gas 11 by the sprayer 12 prior to the entrance of the gas into the heat exchanger 15y. In an exemplary embodiment, the sprayer 12 is a standard misting system. The beat exchanger 15y cools, and thus condenses, the incoming exhaust gas 11 in an initial cooling phase. During that initial cooling phase, the water vapor condenses taking contaminants along with it. The condensed water carrying the contaminants is collected from the heat exchangers 15y and/or 15z in the collector 13, such as a storage tank. For example, the water carrying the contaminants may have a pH of about 3 when it is collected from the heat exchangers 15. After collection, it may be neutralized with an alkaline material until it has a pH of around 7, The neutralized water mixture may then be safely disposed of.

In the embodiment depicted in FIG. 2, the incoming exhaust gas 11 is cooled from approximately 100° F. to approximately −20° F. by the use of two heat exchangers 15y and 15z. It should be understood that these temperatures may vary, and that the gas exiting the landfill may be between 120° F., or even warmer, and 80° F., or cooler, depending on the configuration and conditions of the landfill and how the gas is transferred to the system 1. The first heat exchanger 15y cools the incoming exhaust gas 11 from its initial temperature to a lower temperature, which in the depicted embodiment is approximately 40° F. Again, this temperature may be varied. The gas then enters a second heat exchanger 15z that cools it to approximately −20° F. Again, the temperature of the cooled exhaust gas 16 may be varied, and may, for example, be anywhere between −10° F. and as low as −50° F.

As will be recognized by one of skill in the art in light of this disclosure, any number of heat exchangers may be utilized to cool the incoming gas, which may be a single heat exchanger or several heat exchangers. Further, the heat exchangers 15y and 15z may be any heat exchangers known in the art. In one embodiment, the heat exchangers 15y and 15z are shell and tube heat exchangers, such as u-tube heat exchangers.

The cooled exhaust gas 16, which in the example of FIG. 2 is $CO_2$, $CH_4$, and $N_2$ at approximately −20° F., is then compressed by a compressor 17. In the depicted example, the compressor 17 compresses the cooled exhaust gas 16 to approximately 300 lbs/in² (psi) at 0° F. The $CO_2$ is liquefied at that pressure and temperature, thereby separating the cooled exhaust gas 16 into liquid $CO_2$ 22 and a remaining gas 23 comprised primarily of $CH_4$ and $N_2$.

The compressed mixture of liquid $CO_2$ 22 and remaining exhaust gas 23 may be filtered through an activated carbon filter 19 to remove odorous material therefrom. Odorous material, such as hydrogen sulfide ($H_2S$), may be present in the incoming exhaust gas 11 from the landfill 5 and may be removed in order to provide a clean, non-odorous $CO_2$ product.

The filtered liquid $CO_2$ 22 and remaining gas 23 mixture is collected in the tank 21, where the liquid $CO_2$ 22 is collected and separated from the remaining gas 23. In an exemplary embodiment, the tank 21 will contain about 35% liquid $CO_2$, and about 65% gaseous $CO_2$.

The liquid $CO_2$ 22 collected in the tank 21 may be further filtered, such as in activated carbon filter 26, to further remove any remaining odorous material. The liquid $CO_2$ 22 is then processed in a pelletizer 27 which solidifies at least a portion of the liquid $CO_2$ 22 into a solid $CO_2$ 29. In an exemplary embodiment, the pelletizer 27 pelletizes approximately 40% of the liquid $CO_2$ 22 into solid $CO_2$ 29. Any $CO_2$ not solidified would be $CO_2$ gas 28 recovered and circulated back to the compressor 17. Thereby, the conversion of $CO_2$ into its solid form, dry ice, is maximized.

The cooled remaining exhaust gas 23, which in the depicted embodiment is comprised primarily of $CH_4$ and $N_2$ is circulated in circulation track 24 to recover the cold from the cooled remaining exhaust gas 23. Specifically, the cooled remaining $CH_4$ and $N_2$, which in the depicted example is at approximately 0° F., is circulated through the heat exchangers 15z and 15y. In the heat exchanger 15z the cooled remaining exhaust gas 23 transfers cold into the incoming exhaust gas 11, which brings the temperature of the incoming gas down and warms the cooled remaining exhaust gas 23. In the depicted embodiment, the remaining exhaust gas 23 is warmed from 0° F. to approximately 40° F. The remaining exhaust gas 23, which is now at approximately 40° F., is then passed through the first heat exchanger 15y, Thereby, the cold from the remaining exhaust gas 23 is transferred to the incoming exhaust gas 11, and the remaining exhaust gas 23 is further warmed, such that warmed remaining exhaust gas 25 is outputted from the system 1. In the depicted embodiment, the warmed $CH_4$ and $N_2$ mixture 25 is utilized as fuel for internal combustion engine 7.

FIG. 3 depicts another embodiment of a system 1 for processing exhaust gas from an internal combustion engine 7. The incoming exhaust gas 11 from the engine 7 may be, for example, a mixture of $H_2O$, $O_2$, $CO_2$. The incoming exhaust gas 11 from the engine 7 may be at a very high temperature, such as between 800° F. and 1,000° F. In a common example, the incoming exhaust gas 11 is at about 900° F. The hot incoming exhaust gas 11 may be passed through a fitter 9, such as comprised of granular carbon, to remove $O_2$ from the gas mixture by converting it to $CO_2$.

The incoming exhaust gas 11 then primarily comprised of $H_2O$, $CO_2$ and $N_2$ and is fed through a series of heat exchangers 15x-15z to reduce the temperature to −20° F. In the depicted embodiment, the incoming exhaust gas 11 is first cooled from about 900° F. to about 100° F. in a first heat exchanger 15x. The gas is then transferred to a second heat exchanger 15y, which cools the incoming exhaust gas 11 from about 100° F. to about 40° F. At this stage, a large portion of the water condenses in the heat exchanger and is collected in the collector 13. The gas is then passed to a third heat exchanger 15z where it is further cooled to −20° F. Any remaining water in the gas condenses in the heat exchanger and is collected in the collector 13. As described above, one of skill in the art will recognize that any of a number of types of heat exchangers may be appropriate for this application, including shell and tube heat exchangers.

The cooled exhaust gas 16 is comprised primarily of $CO_2$ and $N_2$ and is then compressed by the compressor 17, such as to 300 psi and 0° F. The $CO_2$ is liquefied and thus separates from the $N_2$, which remains a gas. The liquid $CO_2$ 22 and the remaining $N_2$ 23 collects in the tank 21. The liquid $CO_2$ 22 is then converted to a solid $CO_2$ 29 in a pelletizer 27. Any $CO_2$ not pelletized in the pelletizer 27, is captured as $CO_2$ gas 28 and recirculated to the compressor 17.

The cold remaining $N_2$ 23 follows the recirculation track 24 to recapture the cold therefrom in one or more of the heat exchangers 15x, 15y, 15z. In the depicted embodiment, the cold remaining $N_2$ 23 passes through each of the three heat exchangers 15x, 15y, and 15z. However, in other embodiments, the recirculation track 24 may only pass through a subset of the heat exchangers 15x-15z. The warmed $N_2$ 25 then exits the system 1, and may be collected and stored for use in other applications. Thus, the presently disclosed system 1 and method 40 offers a beneficial way of removing and distilling $N_2$ from exhaust gas without the use of very high pressure or extreme cold temperatures. As $N_2$ is a commonly used gas in a range of industrial applications, it may then be transferred for use in any number of a broad range of industries, including chemical manufacture, pharmaceutical manufacture, petroleum processing, glass and ceramic manufacture, steel making and metal refining and fabrication, pulp and paper manufacture, healthcare, etc.

Figure 4:
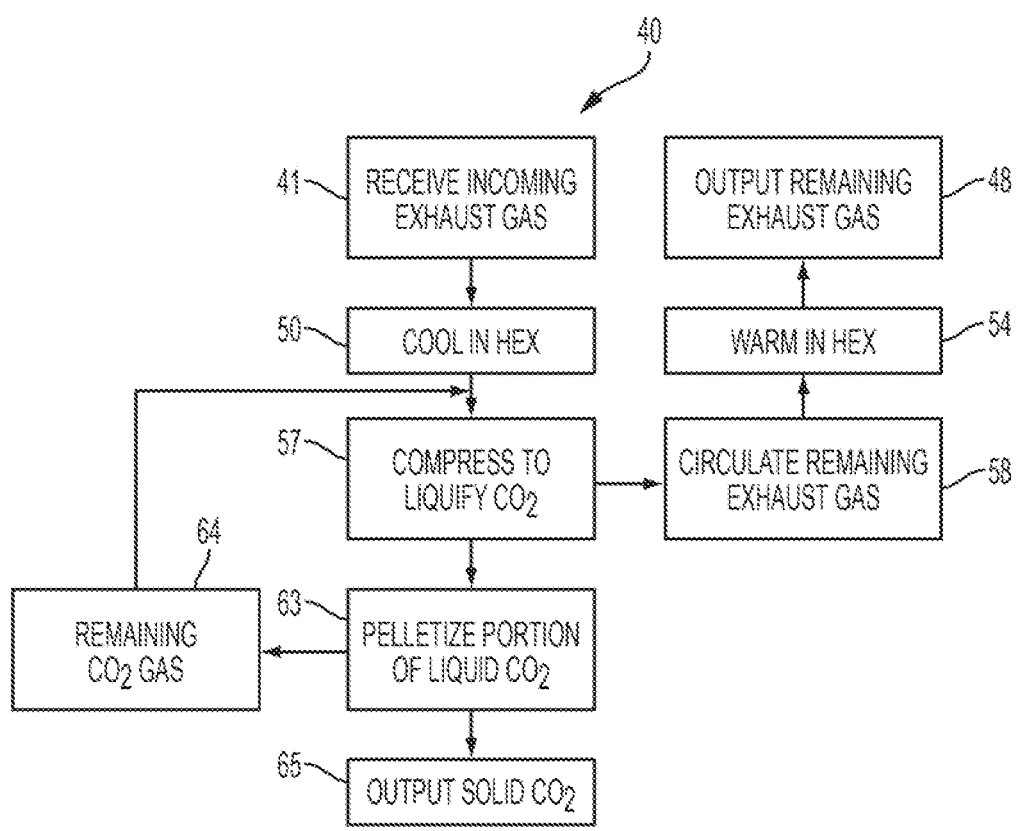
FIG. 4 is a flow chart depicting one embodiment of a method for processing exhaust gas.

FIG. 4 depicts one embodiment of a method 40 of processing exhaust gas that includes $CO_2$. At step 41, incoming exhaust gas is received, such as from a landfill or an internal combustion engine. The incoming exhaust gas is cooled in a heat exchanger at step 50, and is then compressed at step 57 to liquefy any $CO_2$ therein. The remaining exhaust gas is circulated at step 58, and is warmed in the heat exchanger at step 54. The warmed remaining exhaust gas is then outputted at step 48, The $CO_2$ that is liquefied at step 57 is sent to a pelletizer, where at least a portion is pelletized at step 63. Any gaseous remaining is recirculated at step 64 to the compressor, thus cycling through steps 57 and 63 again. The solid $CO_2$ from the pelletizer is outputted at step 65.

Figure 5:
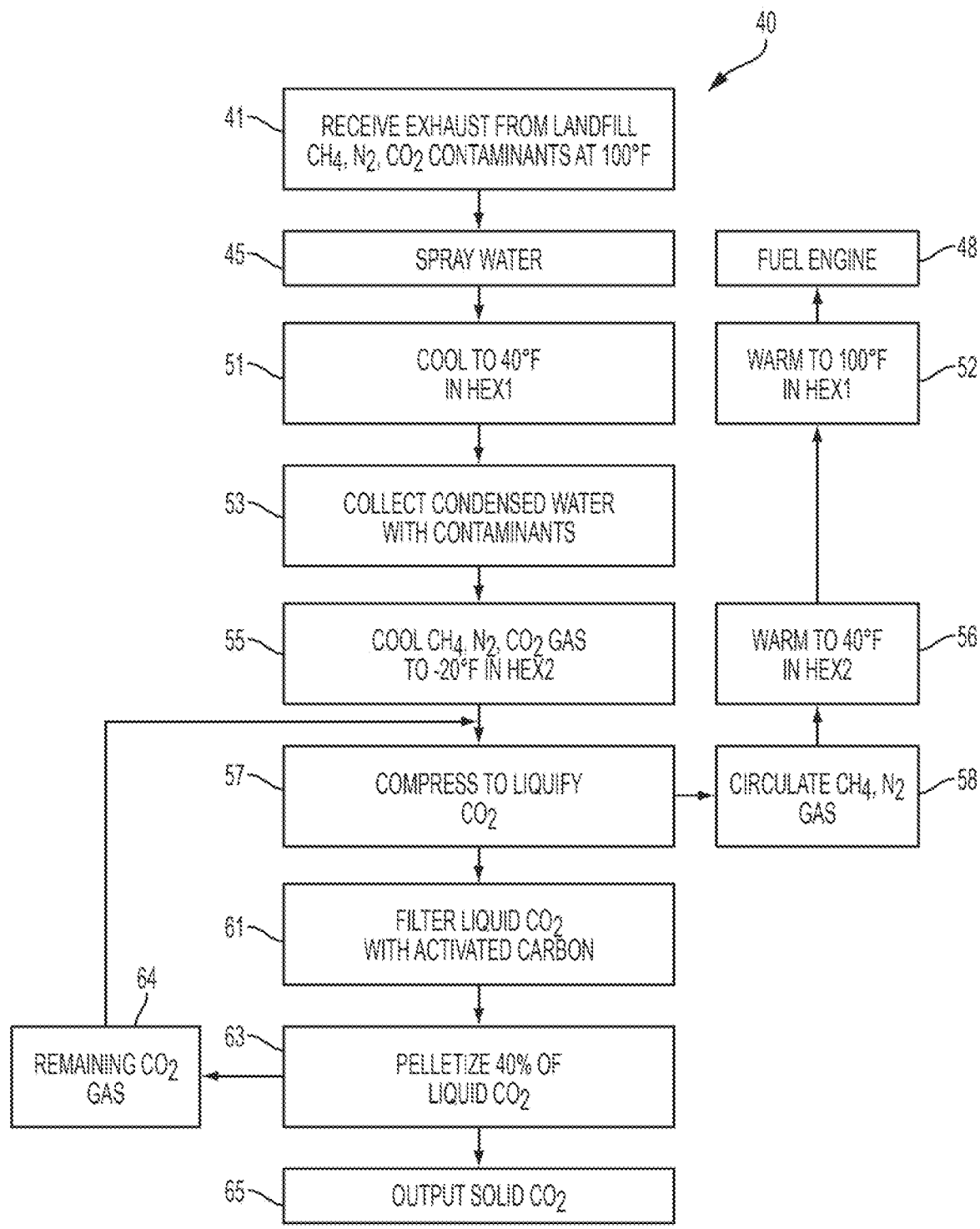
FIG. 5 is a flow chart depicting another embodiment of a method for processing exhaust gas.

FIG. 5 depicts another embodiment of a method 40 of processing exhaust gas. Exhaust gas is received from a landfill at step 41, wherein the exhaust gas is primarily comprised of $CH_4$, $N_2$, $CO_2$, along with some contaminants. The exhaust gas is, for example, at about 100° F. Water is sprayed, or misted, into the incoming exhaust gas at step 45. At step 51, the incoming exhaust gas is cooled to approximately 40° F. in a first heat exchanger. During that cooling process, water condenses in the heat exchanger and extracts contaminants from the gassed mixture in the process. For example, any formaldehyde that may be in the incoming exhaust gas will be condensed into the water. The condensed water with contaminants is collected at step 53, which may then be removed from the system. At step 55, the remaining $CH_4$, $N_2$, and $CO_2$ gas is further cooled to about –20° F. in a second heat exchanger. The cooled gas is then compressed at step 57 to liquefy the $CO_2$. The remaining $CH_4$ and $N_2$ gas mixture is then circulated at step 58. It is passed through the second heat exchanger at step 56 where it is warmed to approximately 40° F., and then passed through the first heat exchanger at step 52 where it is warmed to approximately 100° F. The warmed $CH_4$ and $N_2$ gas mixture may then be used for another purpose, such as to fuel a gas turbine at step 48. Returning to step 57, the liquefied $CO_2$ may then be filtered at step 61, such as with activated carbon. The filtering removes odorous material which may be in the liquid $CO_2$. At step 63, the liquid $CO_2$ is pelletized by the pelletizer, where about 40% of the liquid $CO_2$ is convened to solid $CO_2$. The remaining $CO_2$ gas is circulated at step 64 back to the compressor. At step 65, the solid $CO_2$ is outputted.

Figure 6:
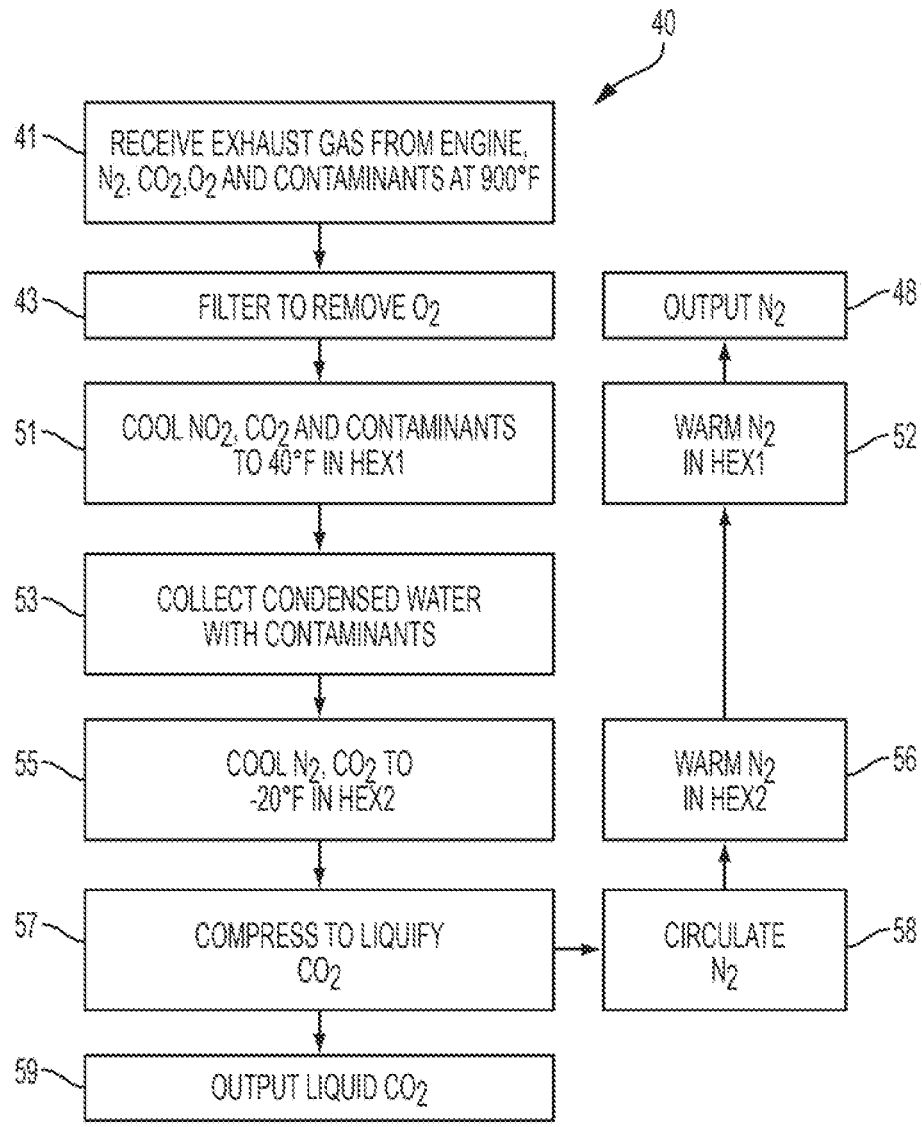
FIG. 6 is a flow chart depicting another embodiment of a method for processing exhaust gas.

Another embodiment of a method of processing exhaust gas includes receiving exhaust from an engine that includes $N_2$, $CO_2$, $O_2$, and contaminants and is at about 900° F. The exhaust gas is filtered to remove $O_2$ at step 43, such as with a filter comprising granular activated carbon that transforms the $O_2$ to $CO_2$. At step 51, the gas mixture of $N_2$, $CO_2$, and contaminants is cooled in a heat exchanger to approximately 40° F. As is described above, this cooling step may be performed using any number of heat exchangers, and may be performed using two heat exchangers as exhibited in FIG. 3. As is described above, water condenses during the cooling process and brings contaminants with it, removing them from the gas mixture. The condensed water with contaminants is collected at step 53. At step 55, the $N_2$ and $CO_2$ gas is further cooled to –20° F. in a second heat exchanger. The cooled exhaust gas is then compressed to liquefy the $CO_2$ therein. In the embodiment of FIG. 6, the liquid $CO_2$ is outputted at step 59, which may be used in any number of industrial applications, such as in oil recovery processes, fertilizer production, food processing and preservation, cold storage application, beverage carbonation, coffee decaffeination, pharmaceutical manufacture, horticulture, fire suppression, and many more. The remaining $N_2$ gas is circulated at step 58 to recapture the cold therefrom. At step 56, the remaining $N_2$ gas is warmed in the second heat exchanger, and at step 52 the $N_2$ is further warmed in the first heat exchanger. The remaining $N_2$ gas is then outputted at step 48, and may be used in any number of industrial applications as is described above.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A method of processing exhaust gas from a landfill, the method comprising:
   receiving incoming exhaust gas from the landfill;
   spraying water into the incoming exhaust gas;
   cooling the incoming exhaust gas in at least one heat exchanger to create cooled exhaust gas, wherein the cooled exhaust gas is primarily comprised of CO2, CH4, and N2;
   removing one or more contaminants of the exhaust gas by capturing the one or more contaminants in a water condensed at the heat exchanger;
   liquifying the CO2 from the cooled exhaust gas with use of a compressor, thereby leaving a remaining exhaust gas primarily comprised of CH4 and N2;
   collecting at least a portion of the CO2 as a liquid and the remaining exhaust gas in a tank at approximately 300 psi and 0° F.;
   filtering the liquid CO2 with activated carbon to remove odorous material from the liquid CO2;
   solidifying at least a portion of the liquid CO2 into odorless solid CO2;
   removing the remaining exhaust gas from the tank; and
   circulating the remaining exhaust gas through the heat exchanger to cool subsequent incoming exhaust gas and warm the remaining exhaust gas.

2. The method of claim 1 wherein the incoming exhaust gas is between 80 degrees Fahrenheit and 120 degrees Fahrenheit, and the cooled exhaust gas is between –10 degrees Fahrenheit and –50 degrees Fahrenheit.

3. The method of claim 1 further comprising utilizing the remaining exhaust gas to fuel an internal combustion engine.

4. The method of claim 1 wherein the step of solidifying comprises pelletizing a portion of the liquid CO2 in a pelletizer.

5. The method of claim 4 wherein the liquid CO2 not pelletized becomes CO2 gas, and further comprising returning the CO2 gas to the compressor.

6. The method of claim 1 wherein the step of filtering is further defined in that the odorous material removed comprises hydrogen sulfide ($H_2S$).

7. The method of claim 1 wherein the step of cooling the incoming exhaust gas includes collecting liquid condensation from the heat exchanger to remove contaminants.

8. A system for processing exhaust gas from a landfill, the system comprising:
   a sprayer positioned upstream of a heat exchanger that sprays water into an incoming exhaust gas from the landfill;
   at least one heat exchanger that cools incoming exhaust gas from the landfill, wherein the cooled exhaust gas is primarily comprised of CO2, CH4, and N2;
   a collector that collects liquid condensation, from the heat exchanger, containing contaminants from the exhaust gas;
   a compressor that compresses the cooled exhaust gas wherein a compressed mixture of liquid CO2 and remaining exhaust gas comprising CH4 and N2 are provided from the compressor;
   a tank at approximately 300 psi and 0° F. receives the mixture of liquid CO2 and the remaining exhaust gas and collects at least a portion of the CO2 as liquid and allows removal of the remaining exhaust gas; and
   an activated carbon receiving the liquid CO2 from the tank that filters odorous material from the liquid CO2;
   a circulation track that passes the remaining exhaust gas through the heat exchanger to cool subsequent incoming exhaust gas and warm the remaining exhaust gas.

9. The system of claim 8 further comprising a pelletizer that pelletizes at least a portion of the liquid CO2 from the tank into odorless, food-grade CO2 pellets, wherein any liquid CO2 not pelletized becomes CO2 gas that is returned to the compressor.

10. The system of the claim 9 wherein the activated carbon filter is configured to filter hydrogen sulfide ($H_2S$) from liquid CO2.

11. The system of claim 8 wherein the incoming exhaust gas is from the landfill and is between 80 degrees Fahrenheit and 120 degrees Fahrenheit, the cooled exhaust gas primarily comprised of CO2, CH4 and N2 and is between −10 degrees Fahrenheit and −50 degrees Fahrenheit.

12. The system of claim 11 further comprising of a sprayer positioned upstream of the heat exchanger that sprays water into the incoming exhaust gas, and a collector that collects liquid condensation from the heat exchanger to remove contaminants.

13. The method of claim 1, comprising the step of, after the step of cooling, routing the cooled exhaust gas to the compressor without passing the cooled exhaust gas through a membrane separator.

14. The system of claim 8, comprising a path from the heat exchanger to the compressor that does not comprise a membrane separator.

* * * * *